US007755700B2

(12) United States Patent
Kimura et al.

(10) Patent No.: US 7,755,700 B2
(45) Date of Patent: Jul. 13, 2010

(54) MOTION-ADAPTIVE NON-INTERLACE CONVERSION APPARATUS AND CONVERSION METHOD

(75) Inventors: Tadayoshi Kimura, Ome (JP); Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1050 days.

(21) Appl. No.: 11/475,878

(22) Filed: Jun. 28, 2006

(65) Prior Publication Data

US 2007/0046811 A1 Mar. 1, 2007

(30) Foreign Application Priority Data

Aug. 30, 2005 (JP) .............................. 2005-249398

(51) Int. Cl.
*H04N 7/01* (2006.01)
*H04N 11/20* (2006.01)
*H04N 5/00* (2006.01)

(52) U.S. Cl. ...................... 348/452; 348/441; 348/448; 348/607; 348/609; 348/620

(58) Field of Classification Search ................. 348/441, 348/448, 452, 607, 609, 620, 663, 669
See application file for complete search history.

(56) References Cited

U.S. PATENT DOCUMENTS 5,412,434 A * 5/1995 Taniguchi et al. ........... 348/669
5,428,398 A * 6/1995 Faroudja ..................... 348/452
(Continued)

FOREIGN PATENT DOCUMENTS

JP      8-32075      3/1996
(Continued)

*Primary Examiner*—Brian P Yenke
(74) *Attorney, Agent, or Firm*—Finnegan, Henderson, Farabow, Garret & Dunner, L.L.P.

(57) ABSTRACT

According to one embodiment, a motion-adaptive non-interlace conversion apparatus includes an interference elimination process circuit which executes a cross-color & dot interference elimination process, an intra-field interpolation process circuit which generates an intra-field interpolation signal using a signal that is obtained by delaying a processed signal, which is subjected to the interference elimination process, with a delay corresponding to 1 field, an inter-field interpolation process circuit which generates an inter-field interpolation signal by using the processed signal and a pre-process signal which is yet to be subjected to the cross-color & dot interference elimination process, a motion detection circuit which obtains a motion detection signal, a mixing circuit which mixes the intra-field interpolation signal and the inter-field interpolation signal with a mixing ratio corresponding to the motion detection signal and outputs a mixed signal, and a multiple-speed conversion circuit which executes a multiple-speed conversion process.

11 Claims, 4 Drawing Sheets

U.S. PATENT DOCUMENTS

| | | | | |
|---|---|---|---|---|
| 5,585,861 | A * | 12/1996 | Taniguchi et al. | 348/669 |
| 5,671,018 | A * | 9/1997 | Ohara et al. | 348/452 |
| 6,262,773 | B1 * | 7/2001 | Westerman | 348/448 |
| 7,170,562 | B2 * | 1/2007 | Yoo et al. | 348/452 |
| 7,193,655 | B2 * | 3/2007 | Nicolas | 348/448 |
| 7,440,031 | B2 * | 10/2008 | Jung | 348/452 |
| 7,532,254 | B1 * | 5/2009 | Woodall | 348/609 |
| 2002/0008785 | A1 * | 1/2002 | Yamaguchi et al. | 348/699 |
| 2003/0071922 | A1 * | 4/2003 | Gomi et al. | 348/666 |
| 2005/0168632 | A1 * | 8/2005 | Neuman et al. | 348/448 |
| 2006/0077299 | A1 * | 4/2006 | Wyman | 348/571 |
| 2007/0070244 | A1 * | 3/2007 | Wyman et al. | 348/448 |
| 2007/0222890 | A1 * | 9/2007 | Matsubara et al. | 348/441 |
| 2008/0129863 | A1 * | 6/2008 | Neuman et al. | 348/448 |

FOREIGN PATENT DOCUMENTS

| | | |
|---|---|---|
| JP | 2650896 | 5/1997 |
| JP | 10-98694 | 4/1998 |
| JP | 10-174109 | 6/1998 |
| JP | 11-150708 | 6/1999 |

* cited by examiner

MOTION-ADAPTIVE NON-INTERLACE CONVERSION APPARATUS AND CONVERSION METHOD

CROSS-REFERENCE TO RELATED APPLICATIONS

This application is based upon and claims the benefit of priority from Japanese Patent Application No. 2005-249398, filed Aug. 30, 2005, the entire contents of which are incorporated herein by reference.

BACKGROUND

1. Field

One embodiment of the invention relates to a motion-adaptive non-interlace conversion apparatus and conversion method. In particular, a cross-color & dot interference elimination circuit is effectively combined, and the image quality can be enhanced, the number of structural elements can be reduced and the driving load can be decreased.

2. Description of the Related Art

In a case where an interlace image signal is to be converted to a non-interlace image signal, a motion-adaptive non-interlace conversion circuit is used. Normally, when this kind of image signal processing circuit is constructed, consideration is given to the reduction in circuit scale and in number of memories used. Such motion-adaptive non-interlace conversion circuits are disclosed, for example, in Jpn. Pat. Appln. KOKAI Publication No. 11-150708, Jpn. Pat. Appln. KOKAI Publication No. 10-098694 and Jpn. Pat. Appln. KOKOKU Publication No. 08-032075.

In KOKAI No. 11-150708, three field memories for inter-field interpolation, motion detection and time/space filtering in a motion-adaptive scan-line interpolation circuit are integrated into a single system. This technique is intended to reduce the circuit scale.

In KOKAI No. 10-098694, in a motion-adaptive scan-line conversion process, interlace image signals are subjected to sub-sampling at a ratio of 2:1, and a signal of a preceding field with the reduced ½ sampling points is generated. A still-image mode interpolation scan-line signal is generated from neighboring upper and lower scan-line image signals of the preceding field with the reduced ½ sampling points and the current field. Thereby, the memory capacity is reduced.

In KOKOKU No. 08-032075, a motion detection circuit is shown. As regards signals indicative of image motion amounts, a representative value that represents a plurality of signals is calculated. This representative value is used in an image motion amount processing circuit.

In the meantime, in an image signal processing circuit, a cross-color & dot interference elimination circuit is used in order to enhance the image quality or to suppress degradation in image quality. In some cases, the cross-color & dot interference elimination circuit is disposed on the front stage of a motion-adaptive non-interlace conversion circuit.

The object of the present invention is to provide a motion-adaptive non-interlace conversion apparatus and conversion method, wherein the control of memories is easy and the circuit scale can be reduced.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
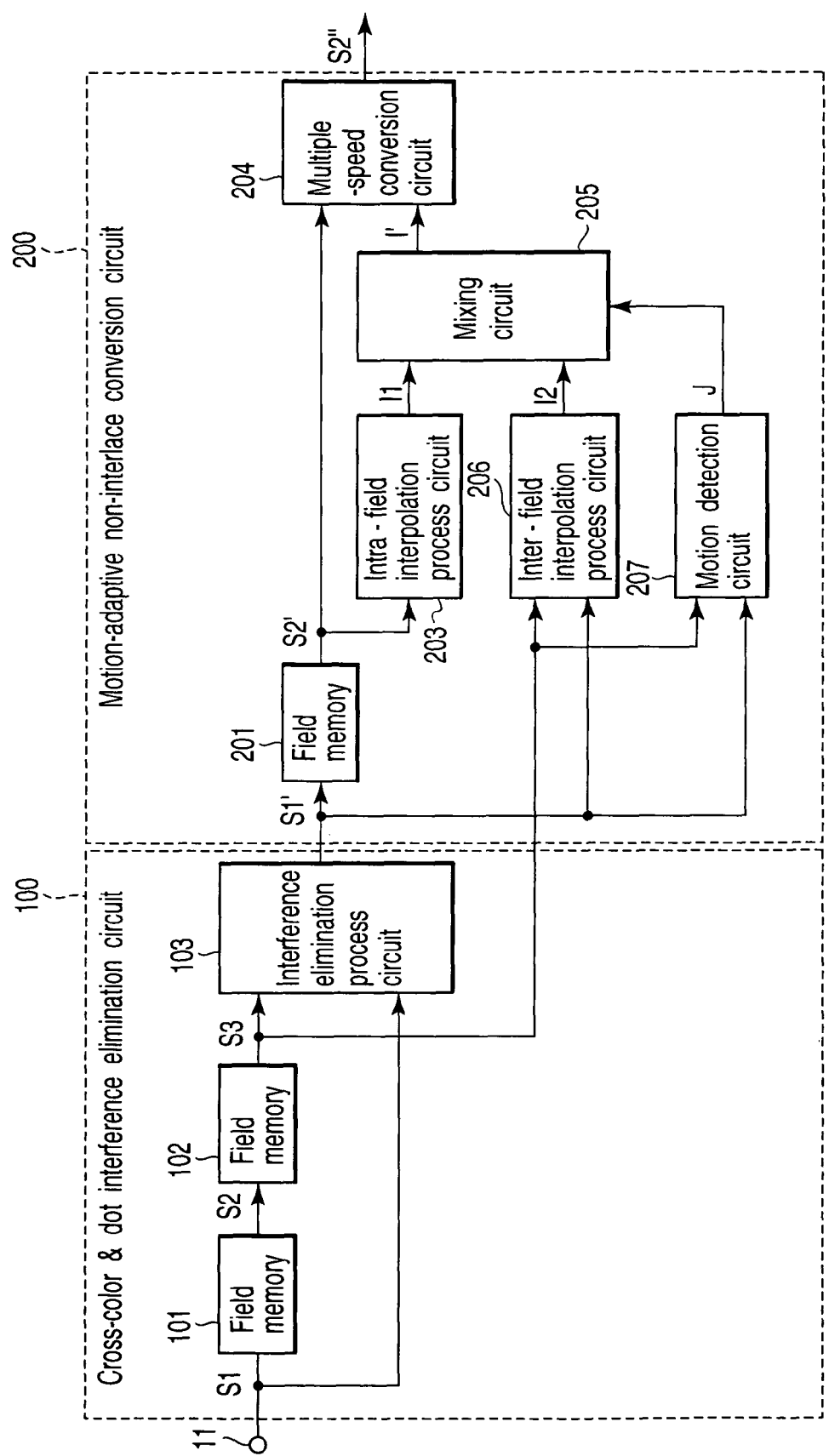
FIG. 1 is a view for describing the structure according to a first embodiment.

Various embodiments according to the invention will be described hereinafter with reference to the accompanying drawings. In general, according to one embodiment of the invention, a motion-adaptive non-interlace conversion apparatus comprises an interference elimination process circuit which executes a cross-color & dot interference elimination process an intra-field interpolation process circuit which generates an intra-field interpolation signal using a signal that is obtained by delaying a processed signal, which is subjected to the interference elimination process, with a delay corresponding to 1 field; an inter-field interpolation process circuit which generates an inter-field interpolation signal by using the processed signal and a pre-process signal which is yet to be subjected to the cross-color & dot interference elimination process a motion detection circuit which obtains a motion detection signal a mixing circuit which mixes the intra-field interpolation signal and the inter-field interpolation signal with a mixing ratio corresponding to the motion detection signal and outputs a mixed signal and a multiple-speed conversion circuit 204 which executes a multiple-speed conversion process Embodiments of the present invention will now be described with reference to the accompanying drawings. FIG. 1 shows an embodiment of the invention. An input video signal is supplied to an input terminal 11. In FIG. 1, numeral 100 denotes a cross-color & dot interference elimination circuit, and 200 denotes a motion-adaptive non-interlace conversion circuit.

The input video signal is delivered to a first field memory 101 and to one of input terminals of an interference elimination circuit 103 within the cross-color & dot interference elimination circuit 100. An output from the first field memory 101 is input to a second field memory 102. An output from the second field memory 102 is supplied to the other input terminal of the interference elimination circuit 103.

The interference elimination circuit 103 cancels cross-color & dot interference, taking advantage of the fact that the phases of color carrier waves between two fields are opposite. Specifically, two inputs are added and a mean value is output.

An output from the interference elimination circuit 103 is input to a third field memory 201 within the motion-adaptive non-interlace conversion circuit 200. An output from the field memory 201 is delivered to an intra-field interpolation process circuit 203 and to one of input terminals of a multiple-speed conversion circuit 204.

The motion-adaptive non-interlace conversion circuit 200 includes an inter-field interpolation process circuit 206. The inter-field interpolation process circuit 206 generates an inter-field interpolation signal. In order to generate the inter-field interpolation signal, the inter-field interpolation process circuit 206 uses an output from the second field memory 102 and an output from the interference elimination process circuit 103.

An inter-field interpolation signal I2, which is generated from the inter-field interpolation process circuit 206, and an intra-field interpolation signal I1, which is generated from the intra-field interpolation process circuit 203, are input to a mixing circuit 205.

In the mixing circuit 205, a mixing ratio between two signals is controlled by a motion detection signal J from a motion detection circuit 207. The motion detection circuit 207 detects an image motion by using the output from the second field memory 102 and the output from the interference elimination process circuit 103.

As regards the mixing ratio in the mixing circuit 205, the ratio of the intra-field interpolation signal becomes higher as the degree of image motion increases, and the ratio of the inter-field interpolation signal becomes higher as the degree of image motion decreases and the image becomes closer to a still image.

An output from the mixing circuit 205 and an output from the field memory 201 are input to the multiple-speed conversion circuit 204. In the multiple-speed conversion circuit 204, the time axis is converted to a multiple speed, and the outputs are alternately selected and produced. In short, the output from the multiple-speed conversion circuit 204 is output as a non-interlace signal.

Figure 2:
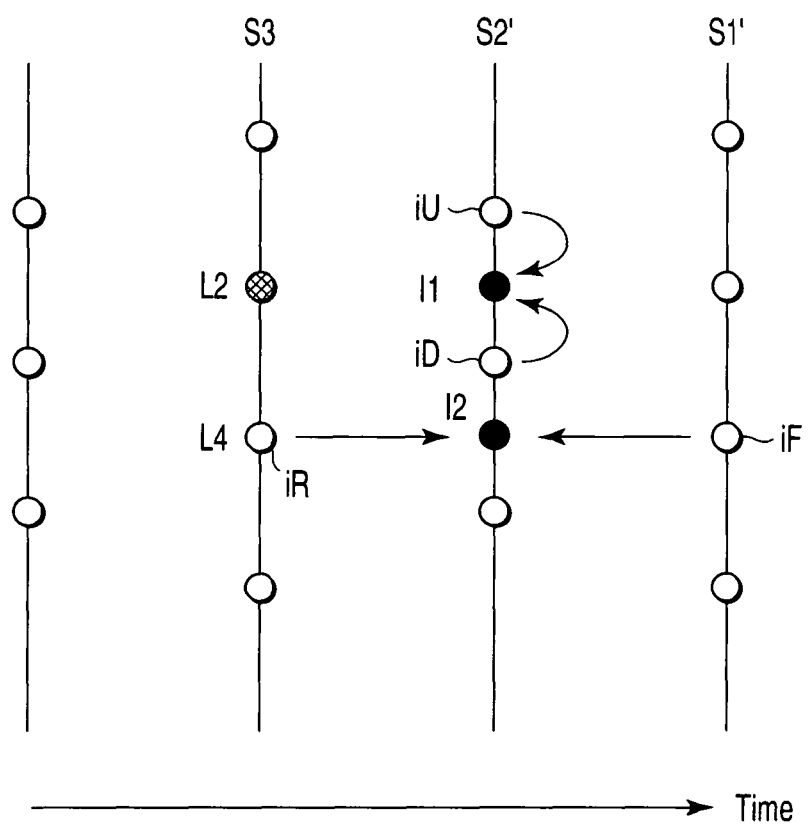
FIG. 2 is a view for explaining the operation of the apparatus according to the first embodiment.

FIG. 2 illustrates how the inter-field interpolation signal and intra-field interpolation signal are generated in the above-described circuit.

When cross-color & dot interference is eliminated by the cross-color & dot interference elimination circuit 100, signals S1 and S3 between two fields are used. Thus, it can be considered that there is a difference of two fields between a processed signal S1', which is obtained after the signal S1 is subjected to cross-color & dot interference elimination, and a pre-process signal S3. In addition, there is a difference of 1 field between the signal S1' and a signal S2'. In the present invention, such a relationship between signals is advantageously utilized.

Using the signal S2', the intra-field interpolation process circuit 203 generates an intra-field interpolation signal I1 (=(iU+1D)/2). Using the signal S' and signal S3, the inter-field interpolation process circuit 206 generates an inter-field interpolation signal I2 (=iF+iR)/2). Since there is a difference of 2 fields between the signal S1' and signal S3, these signals may also be used for detecting image motion.

In the above circuit structure, the signal S3, which is not subjected to dot interference elimination or cross-color interference elimination, is used. The reason why no problem arises even if the signal S3 is used is explained below.

For example, assume that interference occurs in a pixel L2 in FIG. 2. In this case, the motion detection circuit 207 detects such interference as image motion. Specifically, even if the part of the pixel L2 is a still image, it is determined as a motion image. Consequently, the mixing circuit 205 selects the interpolation signal I1 of the intra-field interpolation process circuit 203. As a result, the output of the mixing circuit 205 is not influenced at all by the pixel L2 that includes the interference. Needless to say, the inter-field interpolation signal I2 is adopted at the position of a pixel L4 which is a still image and includes no cross-color & dot interference.

In the above embodiment, the invention is constituted by hardware. The basic concept of the invention is not limited to the above embodiment. A plurality of field memories may not separately be constructed, and may be integrated as a memory device. It is also possible to use a method of generating a delay signal by adjusting the read-out timing by a memory controller.

Figure 3:
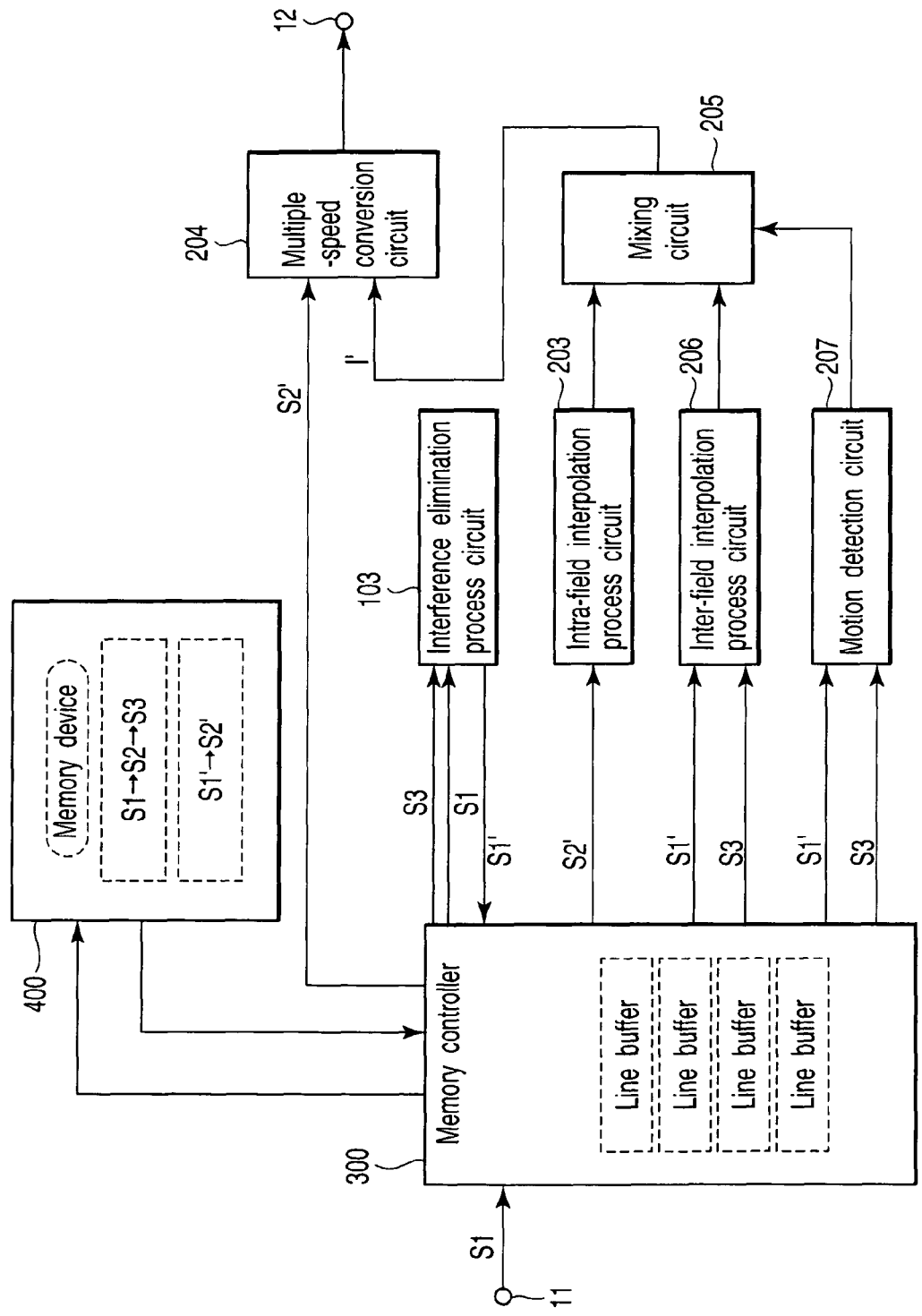
FIG. 3 is a view for describing according to a second embodiment.

FIG. 3 shows another embodiment of the present invention. An input signal S1 from an input terminal 11 is received in a memory controller 300. Under the control of the memory controller 300, the input signal S1 is supplied to an interference elimination process circuit 103 and is temporarily stored in a memory device 400. The input signal S1 is read out of the memory device 400 after two fields, and is used as a signal S3. In this case, the signal S3 is simultaneously supplied to the interference elimination process circuit 103, an inter-field interpolation process circuit 206 and a motion detection circuit 207.

Under the control of the memory controller 300, a signal S1', which has been processed by the interference elimination process circuit 103, is simultaneously supplied to the inter-field interpolation process circuit 206 and motion detection circuit 207 and is temporarily stored in the memory device 400. A time adjustment corresponding to 1 field is executed, and the signal S1' is supplied as a signal S2' to the intra-field interpolation process circuit 203. The signal S2' is also supplied to a multiple-speed conversion circuit 204. The operations of the mixing circuit 205 and multiple-speed conversion circuit 204 are the same as those described in the preceding embodiment.

Figure 4:
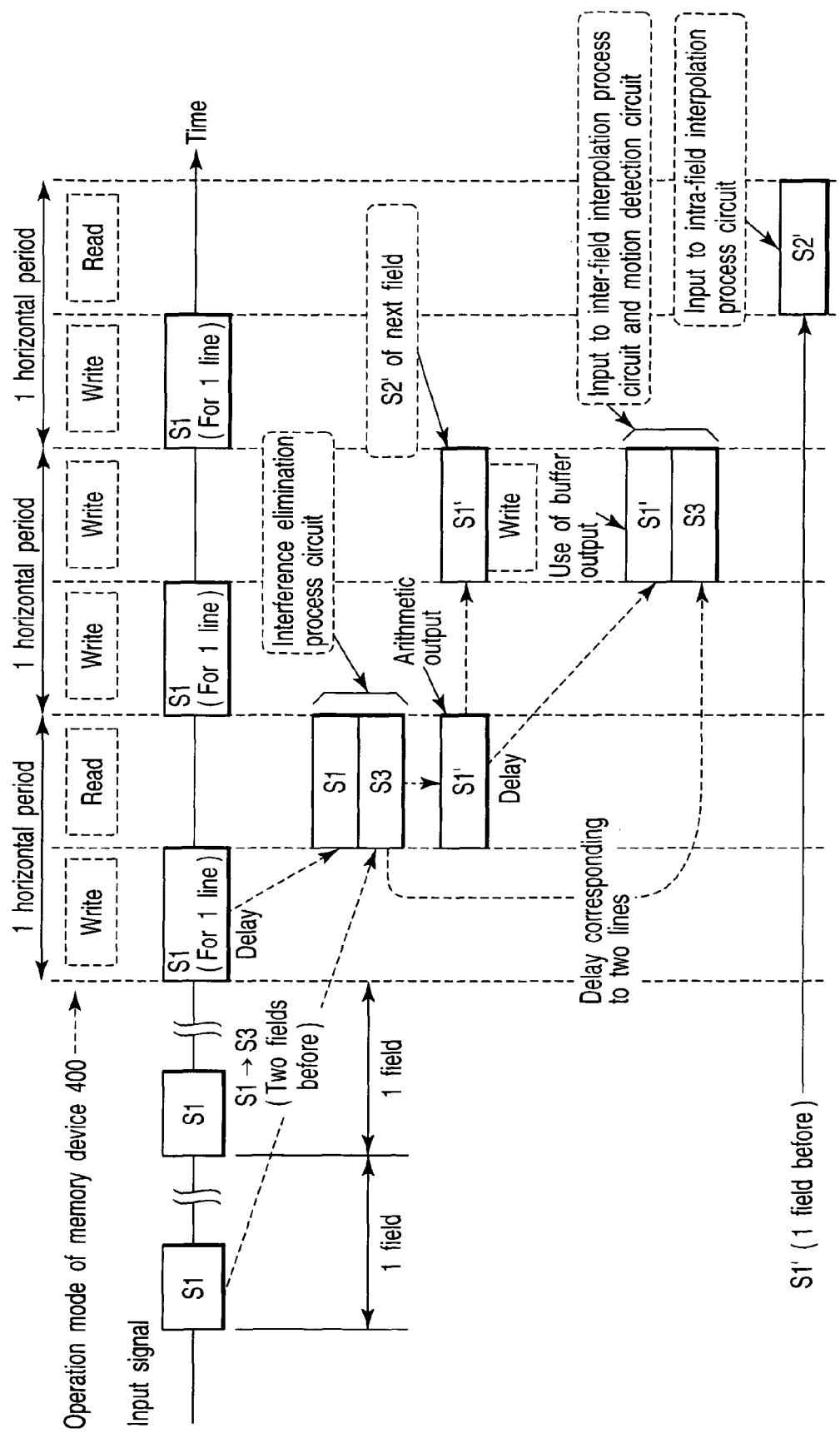
FIG. 4 is a sequence diagram for explaining an example of the operation of the apparatus shown in FIG. 3.

FIG. 4 illustrates an operational sequence of the above-described apparatus. Line buffers for obtaining delays of several lines are provided in the memory controller 300. The line buffers are effectively used, and I-line data delay is executed. For simple description, it is assumed that data write/read is executed on a line-by-line basis in the memory device 400. In a time period t1, 1-line data of the signal S1 is written. As regards the write speed, the data is written in a second half of one horizontal period, for example, in an input-side ½ horizontal period. In a first-half ½ horizontal period, the signal S1, which is written in the memory device 400 before two fields, is read out as the signal S3, and the signal S3, together with the signal S1 that is delayed by the line buffer, is input to the interference elimination process circuit 103. The signal S1', which has been subjected to interference elimination on a pixel-by-pixel basis, is output from the interference elimination process circuit 103.

The signal S1' is delayed by the line buffer. The signal S1', which has been delayed by a time corresponding to 1 line, is supplied to the inter-field interpolation circuit 206 and motion detection circuit 207. In addition, the signal S3 is read out of the memory device 400 and supplied to the inter-field interpolation circuit 206 and motion detection circuit 207.

Thereby, an interpolation signal I' is obtained from the mixing circuit 205. This interpolation signal undergoes time adjustment through a buffer (not shown), and is supplied to the multiple-speed conversion circuit 204. At this time, the signal S1', which has been stored for a 1-field period in the memory device 400, is output from the memory device 400 as a signal S2', and is used.

As has been described above, according to the apparatus of the present invention, with a small memory capacity, the cross-color & dot interference elimination process can be executed and scan-line conversion can be achieved.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A motion-adaptive non-interlace conversion apparatus comprising:
   an interference elimination process circuit which executes a cross-color & dot interference elimination process;
   an intra-field interpolation process circuit which receives a processed signal from the interference elimination process circuit with a delay corresponding to 1 field, and generates an intra-field interpolation signal using the received processed signal;
   an inter-field interpolation process circuit which generates an inter-field interpolation signal by using two inter-field signals of the processed signal and a pre-process signal which is yet to be subjected to the cross-color & dot interference elimination process;
   a motion detection circuit which detects image motion and obtains a motion detection signal by using the two inter-field signals of the processed signal and the pre-process signal which is yet to be subjected to the cross-color & dot interference elimination process;
   a mixing circuit which mixes the intra-field interpolation signal and the inter-field interpolation signal with a mixing ratio corresponding to the motion detection signal and outputs a mixed signal;
   and a multiple-speed conversion circuit which executes a multiple-speed conversion process of an image signal by using the mixed signal from the mixing circuit and the processed signal that is output from the interference elimination process circuit with the delay corresponding to 1 field.

2. The motion-adaptive non-interlace conversion apparatus according to claim 1, further comprising a memory controller and a memory device, wherein the memory controller stores an input signal in the memory device, and reads out the input signal that is stored before two fields, thereby generating the pre-process signal.

3. The motion-adaptive non-interlace conversion apparatus according to claim 1, further comprising a memory controller and a memory device, wherein the memory controller reads out the pre-process signal from the memory device and supplies the pre-process signal to the inter-field interpolation process circuit and the motion detection circuit.

4. The motion-adaptive non-interlace conversion apparatus according to claim 1, further comprising a memory controller and a memory device, wherein the memory controller stores the processed signal in the memory device.

5. The motion-adaptive non-interlace conversion apparatus according to claim 1, further comprising a memory controller and a memory device, wherein the memory controller stores the processed signal in the memory device and supplies, after passing of 1 field, the processed signal to the intra-field interpolation process circuit.

6. A motion-adaptive non-interlace conversion apparatus comprising:
   a first field memory to which an input video signal is supplied;
   a second field memory to which an output from the first field memory is supplied;
   a process circuit which eliminates cross-color & dot interference by using an output video signal from the second field memory and the input video signal;
   a third field memory to which an output from the process circuit is supplied;
   an intra-field interpolation process circuit which generates an intra-field interpolation signal by using an output from the third field memory;
   an inter-field interpolation process circuit which generates an inter-field interpolation signal by using the output from the second field memory and the output from the process circuit;
   a motion detection circuit which detects image motion and obtains a motion detection signal by using the output from the second field memory and the output from the process circuit;
   a mixing circuit which mixes the intra-field interpolation signal and the inter-field interpolation signal with a mixing ratio corresponding to the motion detection signal, and outputs a mixed signal; and
   a multiple-speed conversion circuit which executes a multiple-speed conversion process of an image signal by using the mixed signal from the mixing circuit and the output from the third field memory.

7. A motion-adaptive non-interlace conversion method for use in a motion-adaptive non-interlace conversion apparatus including an interference elimination process circuit which executes a cross-color & dot interference elimination process, an intra-field interpolation process circuit which generates an intra-field interpolation signal, an inter-field interpolation process circuit which generates an inter-field interpolation signal, a motion detection circuit which detects image motion and obtains a motion detection signal, and a mixing circuit which mixes the intra-field interpolation signal and the inter-field interpolation signal with a mixing ratio corresponding to the motion detection signal and outputs a mixed signal, a multiple-speed conversion process of an image signal being executed with use of an interpolated signal from the mixing circuit and a non-interpolated signal from the interference elimination process circuit, the method comprising:
   supplying to the intra-field interpolation process circuit a signal which is obtained by delaying a processed signal from the interference elimination process circuit with a delay corresponding to 1 field;
   supplying the processed signal and a pre-process signal which is yet to be subjected to the cross-color & dot interference elimination process, to the inter-field interpolation process circuit and the motion detection circuit; and
   supplying the intra-field interpolation signal and the inter-field interpolation signal to the mixing circuit and supplying, as a control signal, the motion detection signal from the motion detection circuit to the mixing circuit.

8. The motion-adaptive non-interlace conversion method according to claim 7, wherein a memory controller and a memory device are used, and the memory controller stores an input signal in the memory device, and reads out the input signal that is stored before two fields, thereby generating the pre-process signal.

9. The motion-adaptive non-interlace conversion method according to claim 7, wherein a memory controller and a memory device are used, and the memory controller reads out the pre-process signal from the memory device and supplies the pre-process signal to the inter-field interpolation process circuit and the motion detection circuit.

10. The motion-adaptive non-interlace conversion method according to claim 7, wherein a memory controller and a memory device are used, and the memory controller stores the processed signal in the memory device.

11. The motion-adaptive non-interlace conversion method according to claim 7, wherein a memory controller and a memory device are used, and the memory controller stores the processed signal in the memory device and supplies, after passing of 1 field, the processed signal to the intra-field interpolation process circuit.

* * * * *